US00RE39381E

(19) United States
(12) Reissued Patent
Hakkinen et al.

(10) Patent Number: US RE39,381 E
(45) Date of Reissued Patent: Nov. 7, 2006

(54) ESTABLISHMENT OF A CONNECTION BETWEEN A BASE STATION AND A MOBILE STATION USING RANDOM ACCESS CHANNELS

(75) Inventors: Hannu Hakkinen, Espoo (FI); Seppo Granlund, Helsinki (FI); Seppo Hamalainen, Beijing (CN)

(73) Assignee: Nokia Corporation, Espoo (FI)

(21) Appl. No.: 11/087,107

(22) PCT Filed: Feb. 4, 1997

(86) PCT No.: PCT/FI97/00064

§ 371 (c)(1),
(2), (4) Date: Dec. 9, 1998

(87) PCT Pub. No.: WO97/29596

PCT Pub. Date: Aug. 14, 1997

Related U.S. Patent Documents

Reissue of:
(64) Patent No.: 6,539,236
Issued: Mar. 25, 2003
Appl. No.: 09/117,923
Filed: Dec. 9, 1998

(30) Foreign Application Priority Data

Feb. 6, 1996 (FI) ..... 960541

(51) Int. Cl.
*H04B 7/00* (2006.01)
*H04Q 7/20* (2006.01)

(52) U.S. Cl. ..... 455/525; 455/562.1; 455/437; 455/444; 455/442; 370/332

(58) Field of Classification Search ..... 455/524–525, 455/562.1, 561, 436–444, 101, 134–135, 455/448–449, 63.2, 132; 370/329–336, 342–343, 370/347

See application file for complete search history.

(56) References Cited

U.S. PATENT DOCUMENTS 4,435,840 A * 3/1984 Kojima et al.
4,797,947 A * 1/1989 Labedz
5,109,528 A * 4/1992 Uddenfeldt
5,159,593 A * 10/1992 D'Amico et al.
5,267,261 A * 11/1993 Blakeney, II et al.
5,448,569 A * 9/1995 Huang et al.
5,491,834 A * 2/1996 Chia
5,499,386 A * 3/1996 Karlsson
5,502,725 A * 3/1996 Pohjakallio
5,548,812 A * 8/1996 Padovani et al.
5,594,949 A * 1/1997 Andersson et al.
5,758,266 A * 5/1998 Kornfeld et al.
5,978,657 A * 11/1999 Suzuki

FOREIGN PATENT DOCUMENTS

EP 0 288 904 * 11/1988
EP 0 565 507 * 10/1993
WO WO 91/07037 * 5/1991

* cited by examiner

*Primary Examiner*—Eliseo Ramos-Feliciano
(74) *Attorney, Agent, or Firm*—Pillsbury Winthrop Shaw Pittman LLP

(57) ABSTRACT

A connection establishment method for establishing a random access type connection using a random access channel, which is used in a radio system having several subscriber terminal equipments (37 to 38) and base stations (33 to 36) where one or more transceiver units (40 to 47) operate, and in which system connection establishment between one of the subscriber terminal equipments (37 to 38) and the base station (33 to 36) is possible when the one subscriber terminal equip nt (37 to 38) is situated in the coverage area of one or more transceiver units (40 to 47) of the base station, where the one subscriber terminal equipment (3 to 38) evaluates the quality of the connections to be established. Starting from a condition in which no connection is established with the one subscriber terminal equipment, the one subscriber terminal equipment (37 to 38) forms a random access type connection to more than one base station transceiver unit (40 to 47) included in one or more base stations (33 to 38).m

27 Claims, 1 Drawing Sheet

ESTABLISHMENT OF A CONNECTION BETWEEN A BASE STATION AND A MOBILE STATION USING RANDOM ACCESS CHANNELS

Matter enclosed in heavy brackets [ ] appears in the original patent but forms no part of this reissue specification; matter printed in italics indicates the additions made by reissue.

This application is the national phase of international application PCT/F197/00064, filed Feb. 4, 1997 which designated the U.S.

FIELD OF THE INVENTION

The invention relates to a connection establishment method comprising a random access type connection establishment using a random access channel, which is used in a radio system comprising several subscriber terminal equipments and base stations where one or more transceiver units operate, and in which system the connection establishment between the subscriber terminal equipment and the base station is possible when the subscriber terminal equipment is situated in the coverage area of one or more transceiver units of the base station, in which area the subscriber terminal equipment evaluates the quality of the connections to be established.

The invention further relates to a subscriber terminal equipment which is arranged to establish a random access type connection by using a random access channel in a radio system comprising several subscriber terminal equipments and base stations which comprise one or more transceiver units, and in which system the connection between the subscriber terminal equipment and the base station is possible when the subscriber terminal equipment is situated in the coverage area of one or more base station transceiver units, where the subscriber terminal equipment comprises an evaluation means for monitoring the quality of the connections to be established.

The invention also relates to a radio system comprising several subscriber terminal equipments and base stations which comprise one or more transceiver units and where the subscriber terminal equipment is arranged to send a random access type connection establishment request via a random access channel and in which system the connection between the subscriber terminal equipment and the base station is possible when the subscriber terminal equipment is situated in the coverage area of one more transceiver units of the base station, in which area the subscriber terminal equipment comprises and evaluation means for monitoring the quality of the connections to be established.

BACKGROUND OF THE INVENTION

A typical cellular radio system, such as the CDMA system (Code Division Multiple Access), comprises a set of subscriber terminal equipments and base stations. When a subscriber terminal equipment has no connection on a normal traffic channel, it monitors paging channels of the base station when necessary, sends messages on an access channel to the base station. The paging channel and the access channel provide an organization channel. When a connection is established in the cellular radio system between a subscriber terminal equipment and a base station, either the subscriber terminal equipment or the base station sends a connection establishment request on the organization channel. A specific Random Access Channel (RACH), which is a channel of a subscriber terminal equipment is typically used as an access channel in the CDMA cellular radio system for establishing a connection from among all the possible access channels and from among the phases available for the phase of a pseudo-noise code. When a radio connection is to be established, the terminal equipments send a connection establishment message via an access channel to the base station which forwards it to the system where traffic channel resources are allocated to the connection. When the base station requests a traffic channel connection, it sends via a paging channel a request to the subscriber terminal equipment which responses to the paging by requesting a traffic channel for its use via the access channel.

In the CDMA system, each base station sends continuously a pilot signal so that there is a specific pilot signal in different sectors or beams of the base station because each sector and beam has a specific base station transceiver unit. It is previously known to use a pilot signal for identifying a base station, a beam or sector of the base station. A pilot signal is a spread-coded signal without data modulation which signal each base station sends continuously to its coverage area. The terminal equipment may identify the base station transceiver units by the pilot signal because the phases of the spreading codes in the pilot signal differ from one another. The subscriber terminal equipments continuously carry out measurings of pilot signals, and subscriber terminal equipments establish an active group of the base station transceiver units providing the best connections, the base station transceiver units in the group being utilized when establishing new connections.

Each base station also sends on a sync channel. A signal of the sync channel may be demodulated and detected whenever the pilot signal can be identified. Information is transmitted on the sync channel about the base station, about the power and the phase of the pilot signal and about the size of uplink interferences.

In addition to a circuit-switched connection, the base station and the subscriber terminal equipment may communicate over a packet-mode connection which is used in the PRMA system (Packet Reservation Multiple Access). In that case the channel needed for transmitting the signal is only reserved for the duration of the signal and it is released immediately when the signal is discontinuous or when it ends or has a break. If the signal is sent discontinuously, the channel has to reserved again after each break.

In prior art solutions, when a subscriber terminal is establishing a connection with a base station on the access channel, the connection is only to one base station, sector or beam of the base station. Access channel and paging channel connections are used especially when establishing a traffic channel connection, in which case when the connection establishment is successful, the traffic channel will, at least at first, have a connection to only one base station, sector or beam of the base station. This raises a need to increase considerably the transmission power of the subscriber terminal equipment and/or the base station and carry out fast an updating of the active group, whereby interference level and the amount of signaling will increase. Furthermore, during a packet-mode transmission it is difficult to carry out soft handover the middle of the packet although the quality of the connection during the transmission would change to be favourable for handover.

BRIEF DESCRIPTION OF THE INVENTION

The object of the present invention is to accomplish a solution which will diminish interferences relating especially to the initial stage of the connection and enable the use of macrodiversity also for a packet-mode connection.

This is achieved with a method as shown in the preamble which is characterized in that the subscriber terminal equipment forms a random access type connection to more than one base station transceiver unit included in one or more base stations.

The subscriber terminal equipment of the invention is characterized in that the subscriber terminal equipment comprises a control means for controlling a random access type connection establishment to more than one base station transceiver included in one or more basic stations.

The radio system of the invention is characterized in that the radio system comprises subscriber terminal equipment which is arranged to control a random access type connection establishment between the base station and the subscriber terminal equipment so that it is possible for the subscriber terminal equipment to establish a connection to more than one base station transceiver unit included in one or more base stations.

Considerable advantages are attained with the solution of the invention. By using the method of the invention, macrodiversity state will be assumed from the beginning of connection establishment. In that case the updating of the active group is required less and at the beginning of the connection, a lower transmission power can be used than in prior art solutions. In this way the need for signaling will be reduced and the capacity of the system will increase.

In a packet-mode data transmission, macrodiversity state will also be assumed directly, the state continuing for the duration of the whole packet in which case the quality of the provided connection will worsen less probably during the packet. The use of macrodiversity on a packet-mode connection is possible only by a method according to the invention because it is difficult to carry out soft handover during a packet.

In the SDMA technique (Space Division Multiple Access) the transmission and reception of the base station takes place in narrow beams, each of which has a specific base station transceiver unit. In that case the best connection is enabled with the method of the invention.

The preferred embodiments of the method of the invention will also appear from the appended dependent claims, the preferred embodiments of the subscriber terminal equipment of the invention will appear from the appended dependent claims relating to the subscriber terminal equipment and the preferred embodiments of the radio system of the invention will appear from the appended dependent claims relating to the radio system.

BRIEF DESCRIPTION OF THE SEVERAL VIEWS OF THE DRAWING

In the following, the invention will be explained in more detail with reference to the examples of the accompanying drawings, where.

DETAILED DESCRIPTION OF THE INVENTION

In the following, the invention will be explained in more detail by examining its operation in a CDMA cellular radio system without restricting it thereto. The invention is also suitable for use in a time division GSM (Global System for Mobile communication) system and/or SDMA and PRMA systems.

Figure 1:
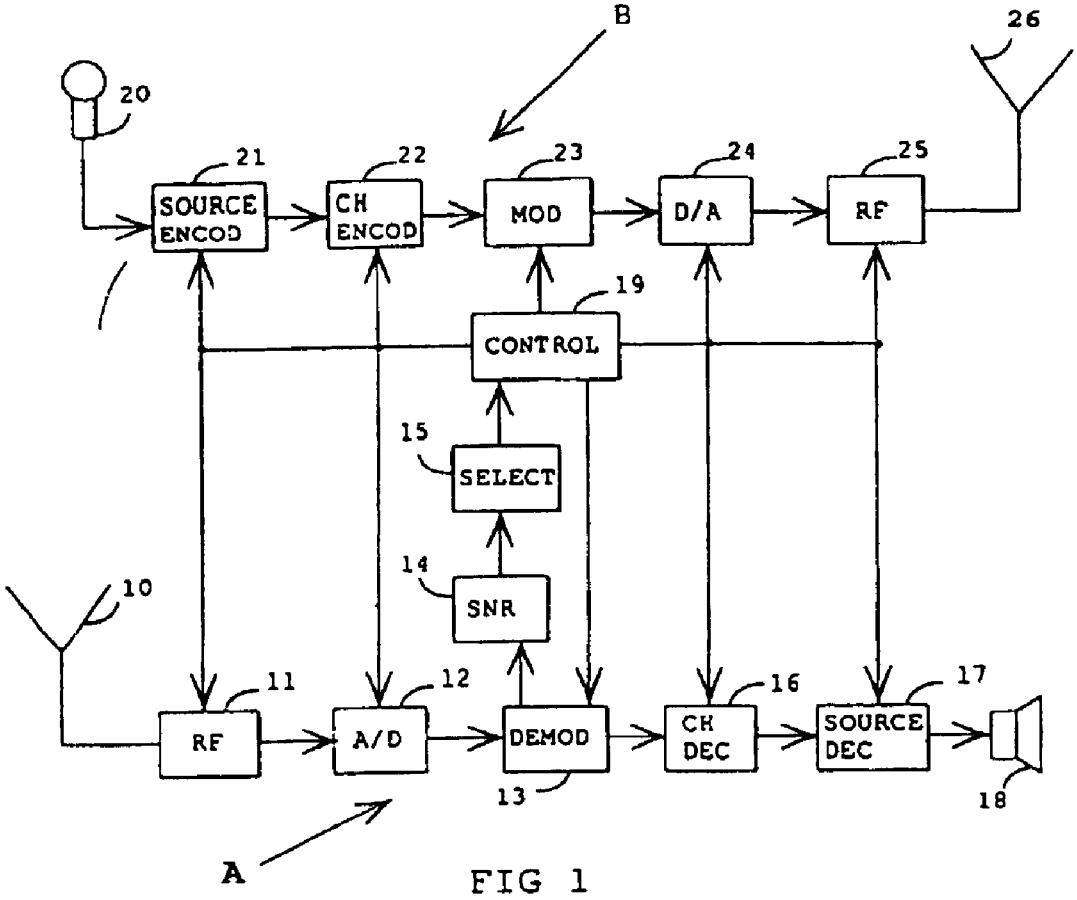
FIG. 1 illustrates the subscriber terminal equipment of the invention.

FIG. 1 illustrates the subscriber terminal equipment of the invention in its essential parts. The subscriber terminal equipment comprises a receiver part A and a transmitter part B. The receiver part A comprises an antenna 10, radio frequency parts 11, an A/D converter 12, a demodulator 13, a signal quality evaluation means 14, selection means 15, a channel decoder 16, a source decoder 17 and a loud speaker 18. The transmitter part B comprises a microphone 20, a source encoder 21, a channel encoder 22, a modulator 23, a D/A converter 24, radio frequency parts 25 and an antenna 26.

The base station transceiver is in main parts similar to the subscriber terminal equipment without a loud speaker and a microphone. However, the base station transceiver generally comprises several reception antennas for space diversity reception. Because of this, the signals of different antennas are also combined by diversity combination means.

The reception part A operates in the following way. A radio frequency analogous signal received by the radio frequency parts 11 from the antenna 10 is transferred to an intermediate frequency and filtered. The signal filtered by the A/D converter 12 is converted into a digital signal. The demodulator 13 comprises an incoherent demodulator which restores a broadband, spread-coded pseudo-noise signal to a narrowband data signal, and an orthogonal demodulator which determines the bits of the received data signal usually on the basis of correlation. Various diversity combinations are also carried out in the demodulator 13 if such diversity combinations are used in the receiver part A. An estimate, such as a signal noise estimate, is provided by the signal quality evaluation means 14. The selection means 15 selects the base station transceiver unit candidates with the best connections for a future connection. The channel decoder 16 typically decodes a convolution-coded signal and its operation is based on a Viterbi algorithm, for example. Further, the channel decoder 16 generally comprises means for decrypting and de-interleaving a pre-processed signal. The source decoder 17 generally decodes an RELP-coded signal (Residually Exited Linear Predictive code) received from the channel decoder 16, and D/A converts and at the end amplifies the signal into a form suitable for the loud speaker 18.

The transmitter part B operates in the following way. The microphone 20 receives an audio signal and sends an electronic response to the source encoder 21 which A/D-converts and RELP-codes it, for example. The digital signal from the source encoder 21 proceeds to the channel encoder 22 which typically convolution-codes the signal. Additionally, the channel encoder 22 typically encrypts the signal and interleaves the bits or bit groups of the signal. The convolution-coded narrowband signal is pseudo-noise encoded into a broadband spread spectrum signal in a modulator 23. After this, the spread spectrum signal is converted into an analogous signal by the D/A converter and the analogous signal is converted into a radio frequency signal in radio frequency parts 25 and sent via the antenna 26 in accordance with prior art.

A control means 19 controls the function of both the receiver part A and the transmitter part B. The means 13 to 17, 19, and 21 to 23 and the functions contained therein are implemented in prior art solutions by a signal handling processor and/or as an ASIC circuit. The antennas 10 and 26 are transmitter and receiver antennas of prior art radio systems. The microphone 20, the load speaker 18, the radio frequency parts 11 and 24 and the A/D converter 12 and the D/A converter 24 are also prior art parts, used in prior art radio systems.

Figure 2:
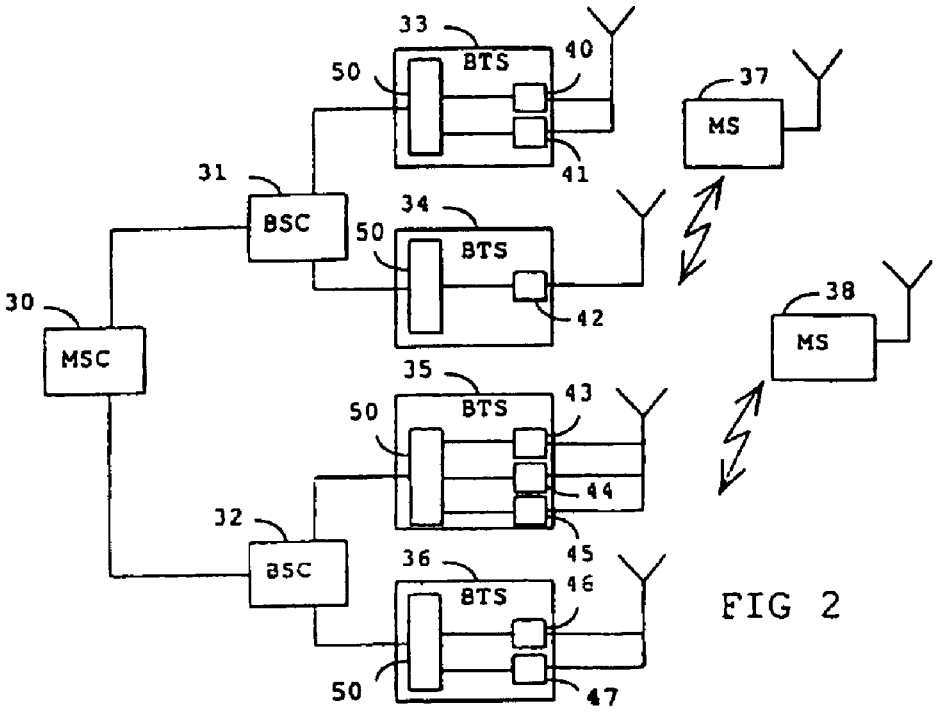
FIG. 2 illustrates the radio system of the invention.

FIG. 2 illustrates a schematic view of the radio system to be explained in the following on the basis of the CDMA technique without restricting the invention thereto. Two base station controllers 31 and 32 are connected to a mobile services switching centre 30 by digital transmission links, the base station controllers monitoring, for example, the number of the connections and deduce from that which of the connections proposed by a subscriber terminal equipment 37 are possible. Base stations 33 and 34, and correspondingly, base stations 35 and 36 are further connected to the base station controllers 31 and 32 by digital transmission links. Subscriber terminal equipments 37 and 38 have a connection to the base station 33 to 36. Each base station controller and the base stations associated with it form a base station system. The coverage area of one base station typically forms one cell. Each of the base stations 33 to 36 has available a finite number of operating radio channels where pilot, sync, paging and traffic signals, for example, are transmitted. Each base station 33 to 36 comprises one or more transceiver units 40 to 47. Their base station antennas may be antenna systems by means of which it is possible for different receiver units of the base station to link to different beams. Diversity antennas can also be used. In addition to the transceiver units 40 to 47, the base stations 33 to 36 comprise peripheral equipment 50 comprising prior art means and power supplies associated with signal transmission, for example.

The method of the invention is now examined more closely by employing FIGS. 1 and 2. It is assumed first that the need for establishing a connection between the subscriber terminal equipment and the base station appears at the subscriber terminal equipment 37. When the subscriber terminal equipment 37 initiates connection establishment, it sends on the access channel (RACH) a transmission request or more generally a connection establishment request relating to several base station transceiver units to one base station 33 from which the request is forwarded to the base station controller 31. In the solution of the invention, several base stations, for example base stations 33 to 35, respond on their paging channel to the connection establishment request or the response connection operates via several base stations or beams or sectors of the base stations. The base station transceiver unit 40 to 47 attends to the transmission and reception operation and the connection in the direction of the beam or sector of the base stations 33 to 36. Thus in the solution of the invention the connection between the subscriber terminal equipment 37 and the base stations 33 to 36 is established in the random access way to more than one base station transceiver unit 40 to 42 included in one or more base stations 33 to 34. After the connection has been established, if a traffic channel connection is needed, the subscriber terminal equipment 37 has a ready traffic channel connection to several base station transceiver units 40 to 42.

A typical connection establishment, which also uses traffic channels, takes place in the CDMA system as in the following Table 1:

TABLE 1

BIOAVAILABILITY RESULTS
ESTERS OF THE HYDROXY ANALOGUE OF METHIONINE (HMB)

| Ester | Time after administration (hours) | 0 | 1 | 2 | 3 | 5 | 7 | 27 | Bioavailability |
|---|---|---|---|---|---|---|---|---|---|
| Isopropyl | [met]* | 0.27 | 1.53 | 1.96 | 2.49 | 2.93 | 2.93 | 1.00 | 59% |
| ester of HMB | [HMB]* | 0 | 1.90 | 1.00 | 0.99 | 0.38 | 0.30 | 0 | |
| Methyl ester | [met]* | 0.42 | 1.26 | 1.58 | 1.64 | 1.66 | 1.86 | 0.53 | 39% |
| of HMB | [HMB]* | 0 | 1.35 | 0.60 | 0.65 | 0.30 | 0.33 | 0 | |
| ethyl ester of | [met]* | 0.44 | 1.61 | 1.87 | 1.94 | 1.97 | 2.13 | 0.66 | 35% |
| HMB | [HMB]* | 0.00 | 2.39 | 0.92 | 0.50 | 0.27 | 0.32 | 0 | |
| a-butyl ester | [met]* | 0.33 | 0.67 | 0.70 | 0.74 | 0.91 | 1.07 | 0.49 | 17% |
| of HMB | [HMB]* | 0.00 | 0.23 | 0.12 | 0.15 | 0.26 | 0 | 0 | |
| Sec butyl | [met]* | 0.31 | 1.25 | 1.48 | 1.53 | 1.14 | 1.22 | 0.42 | 31% |
| ester of HMB | [HMB]* | 0 | 2.15 | 1.06 | 0.59 | 0.42 | 0.52 | 0 | |
| cyclohexyl | [met]* | 0.36 | 0.55 | 0.87 | 1.06 | 1.07 | 1.09 | 0.47 | 20% |
| ester of HMB | [HMB]* | 0.00 | 0.36 | 0.21 | 0.23 | 0.26 | 0.24 | 0 | |

*concentration measured in mg/100 g of blood plasma; met = methionine

In Table 1 the events are in chronological order so that the time axis may be imagined to travel from top to bottom. On the uppermost line the base station calls the subscriber terminal equipment on a paging channel. The subscriber terminal equipment responds to this request on its access channel and requests a connection to several base station transceiver units, which is shown on the second line in Table 1. The base station responds to the request by sending a Channel Assignment Message (Ch Ass M), after which the base station and the subscriber terminal equipment communicate on the normal traffic channel. The first line in Table 1 is in brackets because when the subscriber terminal equipment contacts the base station, Table 1 should be read without its first line. That is, the subscriber terminal equipment then sends a connection request to the base station, which is shown on the second line of the table. After this the base station responds in the same way as in the previous case and it results in a traffic channel connection.

Before the subscriber terminal equipment 37 sends a connection establishment request, the subscriber terminal equipment 37 selects preferably from the base station transceivers 40 to 47 the ones where the quality of the connection is presumably the best and to which it would be preferably in connection. In this way the subscriber terminal equipment sends information about the base station transceiver units 40 to 45 it has selected on the access channel to the base station controller 30 via the base station transceiver unit providing the best connection, which may be the base station transceiver unit 41. In the preferred embodiment of the invention, the base station controller 31 allows all or at least some of the base station transceiver units 40 to 45 selected by the subscriber terminal equipment, and the allowed base station transceiver units, such as 40 to 42, respond to the subscriber terminal equipment on their paging channel and thus establish preferably a macrodiversity connection of soft random access type with the subscriber terminal equipment 37. The reason why the base station controller 31 may restrict the number of the base station transceiver units may the heavy loading of the system at that moment, which loading the base station controller 31 wishes to restrict when allocating new channels.

In an alternative procedure, the subscriber terminal equipment 37 also sends a transmission request to several base station transceivers 40 to 42. This may be based on the use of one random access channel or on that the base station transceiver 40 to 42 comprises a receiver for random access channels of several cells. This procedure may have several purposes. At its simplest, connection establishment is initiated along with several base station transceivers 40 to 42 but the actual connection will be established with only one transceiver. The connection has been established with the best connection at that moment. In a more advanced alternative, the connection establishment message may also proceed via several base station transceivers. In the third alternative the message proceeds along one route but the other base station transceivers are synchronized with the connection request of the subscriber terminal equipment without being able to interpret the message correctly. This will also accelerate the generation of the actual macrodiversity connection.

The subscriber terminal equipment 37, as the other subscriber terminal equipments of the system, evaluates the quality of the connection by utilizing the measuring result of the transmission power of the pilot signal of the base stations 33 to 36 and the power of the received pilot signal. Further, the measuring result of the downlink interference will have an effect on the quality of the connection. On the basis of at least one of the above measuring results of the quality of the connection, the subscriber terminal equipment 37 selects from the base station transceiver units 40 to 47 the ones where the quality of the connection is the best.

The base stations 33 to 36 generally send a base station specific pilot signal and data on the transmission power of the pilot signal and the size of the uplink interference $I_{uplink}$ on their sync channel. The subscriber terminal equipments 37 and 38 measure the strength of the received pilot signal and the size of the downlink interference $I_{downlink}$. If the transmission power of the all the pilot signals is the same, in the preferred embodiment of the invention the selection means 15 of the subscriber terminal equipment 37 selects the base station transceiver units where the received power of the pilot signal is the strongest. If the pilot signals are sent on different power, the power of the transmitted and received pilot signal is compared to one another and it will result in a connection distance attenuation L which can be indicated as a formula in the following way:

| WEEK | COW 1 | COW 2 |
|---|---|---|
| 1 | methyl methioninate | propyl methioninate |
| 2 | — | — |
| 3 | a-propyl methioninate | methyl methioninate |
| 4 | — | — |

where $P_{TXpilot}$ is the power of the transmitted pilot signal and $P_{RXpilot}$ is the power of the received pilot signal. In the preferred embodiment of the invention, the value L is used for selecting base station transceiver units. Thus the connection evaluation means 14 forms a parameter L representing connection distance attenuation and on the basis of this, the selection means 15 select the candidates for the connection from the base station transceiver units.

By considering also the required signal interference ratio $SIR_{req}$ in both uplink and downlink directions, the required transmission power may be calculated for both the subscriber terminal equipment $P_{MS}$ and the base station transceiver unit $P_{STS}$. The required signal interference ratio $SIR_{req}$ for the subscriber terminal equipment is

| WEEK | COW 1 | COW 2 |
|---|---|---|
| 3 | butyl methioninate | octadecyl methioninate |
| 5 | octadecyl methioninate | a-hexyl methioninate |
| 7 | ethyl N-acetyl methioninate | a-butyl methioninate |
| 10 | a-hexyl methioninate | ethyl N-acetyl methioninate |

from which it is obtained as the transmission power $P_{MS}$ of the subscriber terminal equipment $$P_{MS}=SIR_{req}\cdot I_{uplink}\cdot L$$

The required signal interference ration $SIR_{req}$ for the base station transceiver unit is

| WEEK | COW 1 | COW 2 |
|---|---|---|
| 1 | methionine ethyl ester hydrochloride | methionine ethyl ester hydrochloride |
| 2 | — | — |

from which it is obtained the required transmission power $P_{BTS}$ of the base station transceiver unit in the same way as in the case of the subscriber terminal equipment $$P_{BTS}=SIR_{req}\cdot I_{downlink}\cdot L$$

The solution of the invention uses parameters L, $P_{MS}$ and $P_{BTS}$ in a random access type algorithm. By means of a random access type algorithm, the selection means 15 of the subscriber terminal equipment selects the base station transceivers for which the connection distance attenuation L is smaller than some predetermined value and the transmission power of both the base station transceiver unit and the subscriber terminal equipment is preferably smaller. The power of the received signals is preferably measured before spread-coded signals are assembled, that is, from a broadband signal. The reception power of the pilot signal is measured by assembling a pseudo-noise signal of the pilot signal by means of a correlator.

In the following it is assumed that the need for establishing a connection between the subscriber terminal equipment and the base station arises at the base station, at the base station 35, for example. In this case the base station 35 sends on its paging channel a connection establishment request to the subscriber terminal equipment, which may be 38 in this case. The subscriber terminal equipment 38 responds to this request on its access channel and informs the base station controller 31 in its response signal of the base station transceiver units with which it is ready to establish a connection. From this point onwards the connection is established according to the invention similarly as when the subscriber terminal equipment 37 initiates connection establishment.

When operating in system based on FDMA (Frequency Division Multiple Access) or TDMA (Time Division Multiple Access), the solution of the invention is possible when using the same access channel to a random access type connection for several base station transceiver units. For example, a pilot signal is not sent in the GSM system, wherefore macrodiversity has to be generated without any previously evaluated quality information of the connection, or some other signal has to be used instead of the pilot signal for evaluating the quality of the connection. Instead of a pilot signal, it is possible to use a BCCH signal which the base station transceiver unit sends on a BCCH channel (Broadcast Control Channel).

In a system using PRMA technique, data transmission takes place in packet mode. The connection establishment method is similar to the CDMA system described above. By using the solution of the invention also in packet-mode data transmission, several base station transceiver units can be used and macrodiversity will be attained, whereby changes in the quality of the connection are less significant than when in connection to only one base station or base station transceiver unit.

Although the invention has been explained above with reference to the examples of the appended drawings, it is evident that the invention is not restricted thereto, but it can be modified in various ways within the scope of the inventive idea disclosed in the accompanying claims.

What is claimed is:

1. A connection establishment method including a random access connection establishment using a random access channel, which is used in a radio system having a plurality of subscriber terminal equipment and base stations where at least one transceiver unit operates, and in which system connection establishment between one of the subscriber terminal equipment and at least one of the base stations is possible when the one subscriber terminal equipment is situated in a coverage area of at least one transceiver unit of the at least one of the base stations, the method comprising:

evaluating, by the one subscriber terminal equipment, a quality of connections related to a plurality of base station transceiver units included in one of the at least one base stations; and forming random access connections to a plurality of transceiver units included in the at least one of the base stations before a traffic channel connection between the at least one of the base stations and the subscriber terminal equipment.

2. The method according to claim 1, further comprising:

selecting, by the subscriber terminal equipment before the actual connection establishment to a transceiver unit, the plurality of transceiver units to which the quality of the connection is the best when establishing a connection.

3. The method according to claim 2, wherein the subscriber terminal equipment, in a connection establishment request, sends to a base station controller, via a transceiver unit providing the best connection, information about the selected plurality of transceiver units.

4. The method according to claim 3, wherein the base station controller allows the selected plurality of transceiver units to establish a connection with the subscriber terminal equipment.

5. The method according to claim 1, wherein evaluating, by the one subscriber terminal equipment, a quality of connections to be established includes measuring a result of a transmission power in a pilot signal of the at least one of the base stations and a power of a received pilot signal; and selecting the plurality of transceiver units having a greatest power of the received pilot signal in comparison with the transmitted power.

6. The method according to claim 1, wherein evaluating, by the one subscriber terminal equipment, a quality of connections to be established includes measuring a result of downlink interference, and selecting the plurality of transceiver units operating on lower connection transmission power.

7. A subscriber terminal equipment to establish a random access connection using a random access channel in a radio system and a plurality of base station; each one of the plurality of base stations including at least one transceiver unit, the connection between the subscriber terminal equipment and at least one of the plurality of base stations is possible when the subscriber terminal equipment is in a coverage area of one or more of the plurality of transceiver units; the subscriber terminal equipment comprises:

an evaluator to monitor the quality of the connections between the subscriber terminal equipment and a plurality of transceiver unit included in one of the plurality of base stations; and a controller to control random access connections establishment to the plurality of transceiver units included in at least one of the plurality of base stations before a traffic channel connection between the at lest one of the plurality of base stations and the subscriber terminal equipment.

8. The subscriber terminal equipment according to claim 7, further comprising a selector to select the plurality of transceiver units having a best quality of connection; and the controller is arranged to control the subscriber terminal equipment in such a manner that the subscriber terminal equipment is arranged to send information about the selected plurality of transceiver units to a base station controller on the random access channel.

9. The subscriber terminal equipment according to claim 7, wherein the evaluator is arranged to monitor a quality of the connection by measuring a result of a transmission power in a pilot signal of the at least one of the plurality of base stations and a power of a received pilot signal and the selector is arranged to select the plurality of transceiver units having a greatest power of the received pilot signal in comparison with the transmitted power.

10. The subscriber terminal equipment according to claim 7, wherein the evaluator is arranged to monitor a quality of the connection by measuring a result of downlink interference, and the selector is arranged to select the plurality of transceiver units operating on lower transmission power.

11. A radio system comprising:

a subscriber terminal equipment and a plurality of base stations having a plurality of base station transceiver units;

the subscriber terminal equipment is arranged to send a random access connection establishment request via a random access channel wherein a radio system connection between the subscriber terminal equipment and at least one of the plurality of base stations is possible when the subscriber terminal equipment is in a coverage area of one or more base station transceiver units of the plurality of base stations, the subscriber terminal equipment including an evaluator to monitor the quality of the connections between the subscriber terminal equipment and a plurality of base station transceiver units associated with one of the base stations; and to control the establishment of random access connections between the subscriber terminal equipment and a plurality of base station transceiver units included in at least one of the plurality of base stations before a traffic channel connection between the at least one of the plurality of base stations and the subscriber terminal equipment.

12. The radio system according to claim 11, wherein the subscriber terminal equipment is arranged to select, on the basis of the quality of the connection, the plurality of base station transceiver units having the best quality of the connection and to send information about the selected plurality of base station transceiver units to a base station controller on the random access channel via a base station transceiver unit providing the best connection, wherein the base station controller allows the selected plurality of base station transceiver units to be used for the connections required by the subscriber terminal equipment.

13. The radio system according to claim 11, wherein the subscriber terminal equipment is arranged to evaluate the quality of the connection by measuring a result of a transmission power in a pilot signal of the plurality of base station transceiver units and a power of a received pilot signal and wherein the subscriber terminal equipment is arranged to select the plurality of base station transceiver units having the greatest power of the received pilot signal in comparison with the transmitted power.

14. The radio system according to claim 11, wherein the subscriber terminal equipment is arranged to evaluate the quality of the connection by measuring a result of downlink interference, and wherein the subscriber terminal equipment is arranged to select the plurality of base station transceiver units operating on lower transmission power.

15. The radio system according to claim 11, wherein the plurality of base station transceiver units are arranged to receive the connection establishment request of the subscriber terminal equipment.

16. The radio system according to claim 11, wherein the subscriber terminal equipment is arranged to be synchronized with the connection establishment request.

17. A connection establishment method including a random access connection establishment using a random access channel, which is used in a radio system having a plurality of subscriber terminal equipment and base stations where at least one transceiver unit operates, and in which system connection establishment between one of the subscriber terminal equipment and at least one of the base stations is possible when the one subscriber terminal equipment is situated in a coverage area of at least one transceiver unit of the at least one of the base stations, the method comprising:

evaluating, by the one subscriber terminal equipment, a quality of connections related to a plurality of base station transceiver units included in one base station of the plurality of base stations;

forming a random access connection to a first transceiver unit included in a base station;

forming at least one random access connection to at least one other transceiver unit included in a base station; and each of the random access connections being established to one transceiver unit and all of the random access connections being formed before a traffic channel connection between the at least one of the transceiver units and the subscriber terminal equipment.

18. A subscriber terminal equipment to establish a random access connection using a random access channel in a radio system and a plurality of base stations; each one of the plurality of base stations including at least one transceiver unit, the connection between the subscriber terminal equipment and at least one of the plurality of base stations is possible when the subscriber terminal equipment is in a coverage area of one or more of the plurality of transceiver units; the subscriber terminal equipment comprises:

an evaluator to monitor the quality of the connections between the subscriber terminal equipment and a plurality of transceiver units associated with one base station of the plurality of base stations; and a controller;

to control a random access connection establishment to a first transceiver unit included in a base station;

to control a further random access connection establishment to at least one other transceiver unit included in a base station, and each of the random access connections being established to one transceiver unit and all of the random access connections being formed before a traffic channel connection between the at least one of the transceiver units and the subscriber terminal equipment.

19. A connection establishment method in a radio system including a random access connection establishment using a random access channel, which is used in a radio system having a plurality of subscriber terminal equipment and base stations where at least one transceiver unit operates, and in which system connection establishment between one of the subscriber terminal equipment and one of the base stations is possible when the one subscriber terminal equipment is situated in a coverage area of at least one transceiver unit of the one base station, the method comprising:

evaluating, by the subscriber terminal equipment, quality of connections related to a plurality of base station transceiver units included in the at least one base station;

transmitting, on a random access channel, a connection establishment request relating to the base station transceiver units included in the at least one base station to which the quality of connections is evaluated; and forming random access connections between the subscriber terminal and at least some of the base station transceiver units in the connection establishment request by responding, by the base station transceiver units in the connection establishment request, to the connection establishment request on paging channels of the base station transceiver units.

20. A connection establishment method in a radio system including a random access connection establishment using a random access channel, which is used in a radio system having a plurality of subscriber terminal equipment and base stations where at least one transceiver unit operates, and in which system connection establishment between one of the subscriber terminal equipment and one of the base stations is possible when the one subscriber terminal equipment is situated in a coverage area of at least one transceiver unit of the one base station, the method comprising:

evaluating, by the subscriber terminal equipment, quality of connections related to a plurality of base station transceiver units included in the at least one base station;

selecting, by the subscriber terminal equipment, a base station transceiver unit with the connection of the best quality;

transmitting, by the subscriber terminal equipment on a random access channel, a connection establishment request message to the base station transceiver unit with the connection of the best quality, the connection establishment request message comprising information on the quality of evaluated connections; and transmitting, by the base station transceiver unit with the connection of the best quality, a channel assignment message to [file] the subscriber terminal equipment.

21. The method of claim 19 or 20, forming traffic channel connections to the base station transceiver units in the connection establishment request.

22. Subscriber terminal equipment configured to establish a random access connection in a radio system using a random access channel in a radio system and a plurality of base stations, each one of the base stations including a plurality of transceiver units, the connection between the subscriber terminal equipment and at least one of the plurality of the base stations being possible when the subscriber terminal equipment is in a coverage area of one or more of the plurality of base station transceiver units, the subscriber terminal equipment comprising an evaluator to monitor the quality of the connections between the subscriber terminal equipment and the plurality of transceiver units, and the subscriber terminal being configured to transmit, on a random access channel, a connection establishment request relating to the base station transceiver units included in the at least one base station to which the quality of connections is evaluated, the subscriber terminal also being configured to form random access connections between the subscriber terminal and at least some of the base station transceiver units in the connection establishment request when the base station transceiver units in the connection establishment request respond to the connection establishment request on paging channels.

23. Subscriber terminal equipment terminal equipment configured to establish a random access connection in a radio system using a random access channel in a radio system and a plurality of base stations, each one of the base stations including a plurality of transceiver units, the connection between the subscriber terminal equipment and at least one of the plurality of the base stations being possible when the subscriber terminal equipment is in a coverage area of one or more of the plurality of base station transceiver units, the subscriber terminal equipment comprising an evaluator to monitor the quality of the connections between the subscriber terminal equipment and the plurality of transceiver units, and the subscriber terminal being configured to select a base station transceiver unit with the connection of the best quality and the subscriber terminal also being configured to transmit, on a random access channel, a connection establishment request message to the base station transceiver unit with the connection of the best quality, the connection establishment request message including information on the quality of evaluated connections, *the subscriber terminal being configured to receive a channel assignment message as response from* the base station transceiver unit with the connection of the best quality [being configured to respond by transmitting a channel assignment message to the subscriber terminal equipment].

24. The subscriber terminal equipment of claim 26 and 27 wherein the subscriber terminal is configured to form traffic channel connections to the base station transceiver units in the connection establishment request.

25. A radio system comprising:

a subscriber terminal equipment; and a plurality of base stations having a plurality of base station transceiver units, wherein, the subscriber terminal equipment is configured to send a random access connection establishment request via a random access channel and a radio system connection between the subscriber terminal equipment and at least one of the base stations is possible when the subscriber terminal equipment is in a coverage area of one or more transceiver units of that base station, the subscriber terminal equipment includes an evaluator to monitor the quality of the connections between the subscriber terminal equipment and the plurality of transceiver units and the subscriber terminal is configured to transmit, on a random access channel, a connection establishment request relating to the base station transceiver units included in the at least one base station to which the quality of connections is evaluated, the subscriber terminal, and wherein, at least some of the base station transceiver units in the connection establishment request are configured to form random access connections with each other by responding, by the base station transceiver units in the connection establishment request, to the connection establishment request on paging channels of the base station transceiver units.

26. A radio system comprising:

a subscriber terminal equipment; and a plurality of base stations each having a plurality of base station transceiver units, wherein, the subscriber terminal equipment is configured to send a random access connection establishment request via a random access channel, a radio system connection between the subscriber terminal equipment and at least *one* of the base stations is possible when the subscriber terminal equipment is in a coverage area of one or more transceiver units of that base station, the subscriber terminal equipment includes an evaluator to monitor the quality of the connections between the subscriber terminal equipment and the plurality of transceiver units, the subscriber terminal is also configured to select a base station transceiver unit with the connection of the best quality and also to transmit, on a random access channel, a connection establishment request message to the base station transceiver unit with the connection of the best quality, the connection establishment request message comprising information on the quality of evaluated connections, and wherein the base station transceiver unit with the connection of the best quality is configured to respond by transmitting a channel assignment message to the subscriber terminal equipment.

27. The CDMA radio system of claim 25 or 26, wherein the subscriber terminal and the base station units in the connection establishment request are configured to form traffic channel connections with each other.

* * * * *